(12) United States Patent
Li

(10) Patent No.: US 8,161,932 B2
(45) Date of Patent: Apr. 24, 2012

(54) MOPED TRANSMISSION

(76) Inventor: William Wei Li, Cerritos, CA (US)

( * ) Notice: Subject to any disclaimer, the term of this patent is extended or adjusted under 35 U.S.C. 154(b) by 101 days.

(21) Appl. No.: 12/876,387

(22) Filed: Sep. 7, 2010

(65) Prior Publication Data

US 2012/0055435 A1    Mar. 8, 2012

(51) Int. Cl.
*F02B 75/32* (2006.01)
(52) U.S. Cl. .................. 123/179.24; 123/197.1
(58) Field of Classification Search ............ 123/179.24, 123/185.8, 185.9, 197.1
See application file for complete search history.

(56) References Cited

U.S. PATENT DOCUMENTS

| | | | | |
|---|---|---|---|---|
| 2,760,385 A | * | 8/1956 | Fuchs | 74/625 |
| 4,140,195 A | * | 2/1979 | Watanabe et al. | 180/205.3 |
| 6,357,413 B1 | * | 3/2002 | Ito et al. | 123/197.1 |
| 6,715,376 B2 | * | 4/2004 | Hojyo et al. | 74/414 |
| 6,962,096 B2 | * | 11/2005 | Hojyo | 74/606 R |
| 7,059,208 B2 | * | 6/2006 | Ho | 74/329 |
| 2004/0040533 A1 | * | 3/2004 | Laimboeck | 123/197.1 |
| 2006/0130802 A1 | * | 6/2006 | Laimboeck | 123/197.1 |

* cited by examiner

*Primary Examiner* — Hai Huynh
(74) *Attorney, Agent, or Firm* — Clement Cheng

(57) ABSTRACT

A moped transmission includes a crankcase assembled in four sections, namely a first section, a second section, a third section and a fourth section. A crankshaft is formed as an eccentric shaft, and the crankshaft has a crankshaft gear mounted to the crankshaft. The crankshaft passes through the first section, and the crankshaft passes through and is rotably mounted to the first planar vertical mounting face. An engine connected to the first section and the second section. A main shaft has a main shaft gear in mesh with the crankshaft gear. The main shaft passes through and is rotably mounted outside the first planar vertical mounting face. The main shaft gear is mounted to the main shaft outside the first section such that the main shaft gear is encapsulated between the first section and the third section.

17 Claims, 4 Drawing Sheets

MOPED TRANSMISSION

FIELD OF THE INVENTION

A transmission system for a kick start moped.

DISCUSSION OF RELATED ART

A number of moped transmission have been made in the prior art for improving different features of the configuration. Previously, other transmission systems for outside kick start devices were made for mopeds all having different transmission.

SUMMARY OF THE INVENTION

Generally, a user sits on top of a moped which is like a motorcycle in that it has a pair of wheels, namely a front wheel and a rear wheel. The user can use the pedals to propel the moped, or to start the moped engine. The pedals are connected to a kick start shaft which are mechanically connected to the engine for starting the engine. Preferably, the engine is a four stroke engine.

The present invention includes a multi-part crankcase cover, crankshaft, main shaft, output shaft, kick start shaft, gearshift, output sprocket, kick start sprocket and transmission chain. The crankshaft, main shaft, output shaft and kick start shaft are all assembled in the crankcase. One side of output shaft extends out of the crankcase, and the output sprocket is assembled on it. The two ends of the kick start shaft extend out of the crankcase. The kick start sprocket and kick rod are assembled on two ends. The crankshaft gear drive, driving gears, primary driving gear and secondary drive gear drive the primary driven gear, secondary driven gear, output shaft, output sprocket, kick start sprocket and rear wheel. The application of the one way clutch in the kick start sprocket provides improved access to the transmission chain.

The second embodiment of the moped transmission includes a crankcase assembled in four sections, namely a first section, a second section, a third section and a fourth section. The first section is connected to the second section. The third section is connected to the first section, and the second section is connected to the fourth section. The first section has a first planar vertical mounting face, and the second section has a second planar vertical mounting face. A crankshaft is formed as an eccentric shaft. The crankshaft has a crankshaft gear mounted to the crankshaft. The crankshaft passes through the first section. The crankshaft passes through and is rotably mounted to the first planar vertical mounting face. The crankshaft gear is mounted to the crankshaft outside the first section such that the crankshaft gear is encapsulated between the first section and the third section. An engine connected to the first section and the second section. The engine further includes an engine piston mechanically connected to the crankshaft.

A main shaft has a main shaft gear and is in mesh with the crankshaft gear. The main shaft passes through and is rotably mounted outside the first planar vertical mounting face. The main shaft gear is mounted to the main shaft outside the first section such that the main shaft gear is encapsulated between the first section and the third section. The main shaft is rotably mounted to the first section and to the second section. The main shaft passes through the first section and the second section. The synchronizer is slidably mounted to the main shaft. A primary driving gear is mounted to the main shaft. The primary drive gear is selectively engagable with the synchronizer. The primary drive gear rotates freely independent of the main shaft when not engaged with the synchronizer, but rotates with the main shaft when engaged with a synchronizer. A secondary driving gear is also mounted to the main shaft. The secondary drive gear is selectively engageable with the synchronizer. The secondary drive gear rotates freely independent of the main shaft when not engaged with the synchronizer, but rotates with the main shaft when engaged with the synchronizer. The output shaft is rotably mounted to the first section and to the second section. The output shaft passes through the first section and the second section. A primary drive gear is mounted on the output shaft, and the primary drive gear is mounted between the first section and the second section. The primary driving gear is meshed to drive the primary drive gear when the synchronizer engages the primary driving gear. A secondary drive gear is mounted on the output shaft. The secondary drive gear is mounted between first section and the second section. The secondary driving gear is meshed to drive the secondary drive gear when the synchronizer engages the secondary driving gear. An output sprocket is mounted on the output shaft and receives rotation from the output shaft when the synchronizer is engaged with either the primary driving gear or the secondary driving gear. A kick start shaft has a kick start sprocket mounted on the kick start shaft. The transmission chain is installed between the kick start sprocket and the output sprocket. An inside sprocket is also mounted on the output shaft such that the inside sprocket has an inside sprocket axis of rotation coaxial to an outside sprocket axis of rotation. The inside sprocket drives a wheel of the moped.

Optionally, the primary drive gear, the secondary drive gear, the primary driving gear, the secondary driving gear and the synchronizer are mounted between the first section and the second section. Optionally, the primary drive gear, the secondary drive gear, the primary driving gear, the secondary driving gear and the synchronizer are mounted between the first section and the second section. Optionally, a starter motor mounted to the second section and the fourth section, further including a starter shaft mounted on the starter motor so that it drives a starter shaft sprocket, further including a starter sprocket mounted on the crankshaft. The starter sprocket receives a starter chain, and the starter chain mechanically connects the starter shaft sprocket to the starter sprocket. Optionally, the starter shaft sprocket, the starter chain and the starter sprocket are mounted between the fourth section and the second section. Optionally, the crankshaft gear and the main shaft gear are mounted between the first section and the third section. Optionally, the primary drive gear, the secondary drive gear, the primary driving gear, the secondary driving gear and the synchronizer are mounted between the first section and the second section. Optionally, a starter motor is mounted to the second section and the fourth section. A starter shaft is mounted on the starter motor so that it drives a starter shaft sprocket. A starter sprocket is mounted on the crankshaft, and the starter sprocket receives a starter chain, so that the starter chain mechanically connects the starter shaft sprocket to the starter sprocket. Optionally, the starter shaft sprocket, the starter chain and the starter sprocket are mounted between the fourth section and the second section. Optionally, the crankshaft gear and the main shaft gear are mounted between the first section and the third section. A starter motor can be mounted to the second section and the fourth section. A starter shaft can be mounted on the starter motor so that it drives a starter shaft sprocket. A starter sprocket can be mounted on the crankshaft, so that the starter sprocket receives a starter chain, and the starter chain mechanically connects the starter shaft sprocket to the starter sprocket. The starter shaft sprocket, the starter chain and the starter sprocket are preferably mounted between the fourth section and the second section.

The starter motor preferably has a power output parallel to the crankshaft. The starter motor can be mounted to the crankcase on top portion of the crankcase. Similarly, the gear selector shifting knob can be mounted to the crankcase on a top portion of the crankcase.

Figure 1:
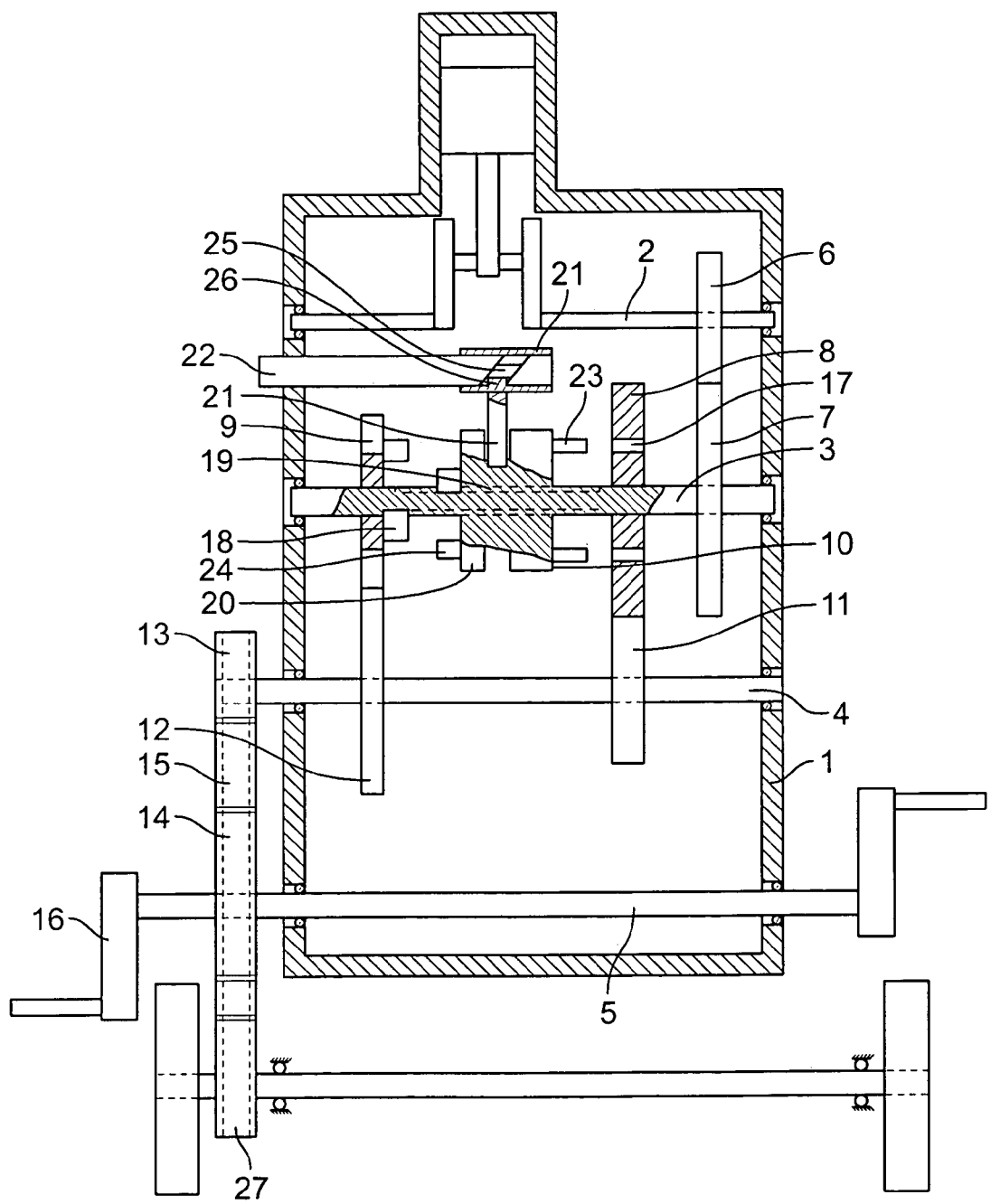
FIG. 1 is a first embodiment cross-section diagram of the present invention showing the typical parts of a two speed moped transmission.
Figure 2:
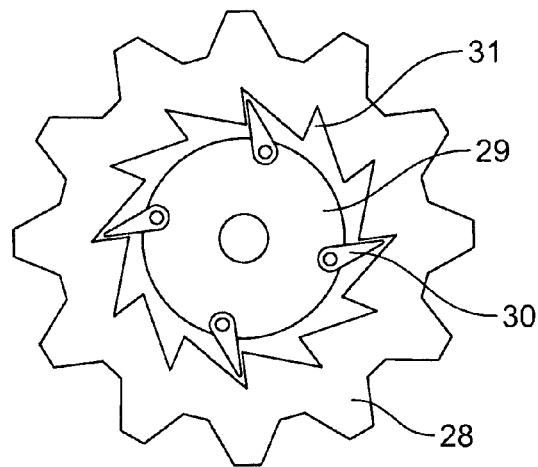
FIG. 2 is a first embodiment side view of the foot pedal crank sprocket.

The following call out list of elements can be useful in understanding the drawings.
Cover 1
Crankshaft 2
Main Shaft 3
Output Shaft 4
The Kick Start Shaft 5
Crankshaft Gear 6
Main Shaft Gear 7
Primary Driving Gear 8
Secondary Driving Gear 9
Gearshift 10
Primary Drive Gear 11
Secondary Drive Gear 12
Output Sprocket 13
Kick Start Sprocket 14
Transmission Chain 15
Kick Rod 16
Combination Hole 17
End Surface Gear 18
Spline Slot 19
Shifting Sleeve 20
Shifting Fork 21
Fork Device 22
Combination Pin 23
Shifting Gear 24
Acclivitous Slot 25
Raised Shifting Pin 26
Rear Wheel Transmission Sprocket 27
Ratchet 28
Rotor 29
Pawl 30
Gear Retainer 41
Started Chain First Retainer 42
Started Chain Second Retainer 43
Engine 44
Starter Motor 45
Access Port 46
Starter Shaft 47
Starter Shaft Sprocket 48
Ratchet Slot 31
First Section 101
Second Section 102
Third Section 103
Fourth Section 104
Shifter Knob 122
Shifter Knob Axle 222

DETAILED DESCRIPTION OF THE PREFERRED EMBODIMENT

The present invention includes a transmission system for a kick start device for a moped. The transmission includes a crankcase cover 1, formed in four separate sections. The first section 101 meets with the second section 102. The third section 103 meets with the first section 101. The fourth section 104 meets with the second section 102.

In the first embodiment, the transmission also includes a crankshaft 2 which is formed as an eccentric shaft connected to the engine piston in a mechanical fashion. The transmission also includes a main shaft 3, driven by the crankshaft via gears. The output shaft 4 is driven by the main shaft via gears. The output shaft 4, therefore receives mechanical power from crankshaft gear 6, passing through main shaft gear 7, then passing through either primary driving gear 8, or through the secondary driving gear 9, as selected by the gearshift 10. This passes through mechanical power to either the primary drive gear 11, or the secondary driven gear 12, which output power to output sprocket 13 and then transmission chain 15.

The kick start shaft 5 is mechanically connected to kick start sprocket 14. The crankshaft 2, main shaft 3, output shaft and the kick start shaft 5 are assembled in crankcase cover 1. One side of output shaft 4 extends out of the crankcase cover 1. The output sprocket 13 is assembled on the output shaft. The two ends of the kick start shaft 5 extend out of the crankcase cover 1, and the kick start sprocket 14 and kick rod 16 are assembled on one end of the same side as the output sprocket 13. Another kick rod 16 is assembled on the other end, and crankshaft gear 6 is assembled on crankshaft 2. The main shaft gear 7 is assembled on main shaft 3, and the main shaft gear 7 meshes with the crankshaft gear 6. The primary driving gear 8 and secondary driving gear 9 are mounted in free rotation with the main shaft 3 through their respective center holes.

At least one combination hole 17 is formed on primary driving gear 8. The end surface gear 18 is formed on the secondary driving gear 9 preferably as dogs which face towards the primary driving gear 8. The main shaft 3 between the primary driving gear 8 and secondary driving gear 9 have a spline slot 19. The gearshift 10 is assembled in the crankcase cover 1 beside the primary driving gear 8 and the secondary driving gear 9. The gearshift 10 also includes the shifting sleeve 20 preferably formed as a synchronizer, actuated by a shifting fork 21 and the fork device 22 preferably formed as a fork shifter. The shifting sleeve 20 preferably formed as a synchro is not freely rotating with the main shaft and is slidably mounted thereto via a corresponding slot so that it slides on the spline slot 19 on the main shaft 3 between the primary driving gear 8 and the secondary driving gear 9. The shifting sleeve 20 is fixed in the spline slot 19 on the main shaft 3. There is a corresponding combination pin 23 on one end surface of the shifting sleeve 20 capable of being connected to the combination hole 17 on the primary driving gear 8. Similarly, there is corresponding shifting gear 24 on the other end connected to the end surface gear 18 of the secondary driving gear 9. An acclivitous slot 25 is formed on the fork device 22. The fork device 22 is assembled in the inner hole of shifting fork 21 and a raised shifting pin 26 is formed in the inner hole of shifting fork 21. The shifting pin 26 is embedded in the acclivitous slot 25 of the fork device 22, and the split end of the shifting fork 21 is embedded in the transverse slot of the shifting sleeve 20. The primary driven gear 11 is assembled on the output shaft 4 and the teeth mesh with teeth of the primary driving gear 8. The secondary driven gear 12 is assembled on the output shaft 4 and the teeth mesh with teeth of the secondary driving gear 9. The output sprocket 13 is assembled on the end of the output shaft 4 which extends outside of the crankcase cover 1. The kick start sprocket 14 is assembled on the kick start shaft 5 on the same side as the output sprocket 13. The transmission chain 15 is connected to output sprocket 13, and the kick start sprocket 14 is connected to rear wheel transmission sprocket 27.

The kick start sprocket 14 includes a one-way clutch, and the one-way clutch includes a ratchet 28, a rotor 29 and a pawl 30. The ratchet 28 is ring shaped with an external surface formed as a gear so that it can be meshed with the transmission chain 15. Also, there is ratchet slot 31 formed as a groove on the internal surface of the ratchet 28 for engagement of the pawl 30 therein. The rotor 29 is assembled on the kick start shaft 5 and running together, the pawl 30 is assembled on the rotor 29, with the pawl 30 embedded in the ratchet slot 31 on the ratchet 28.

Figure 3:
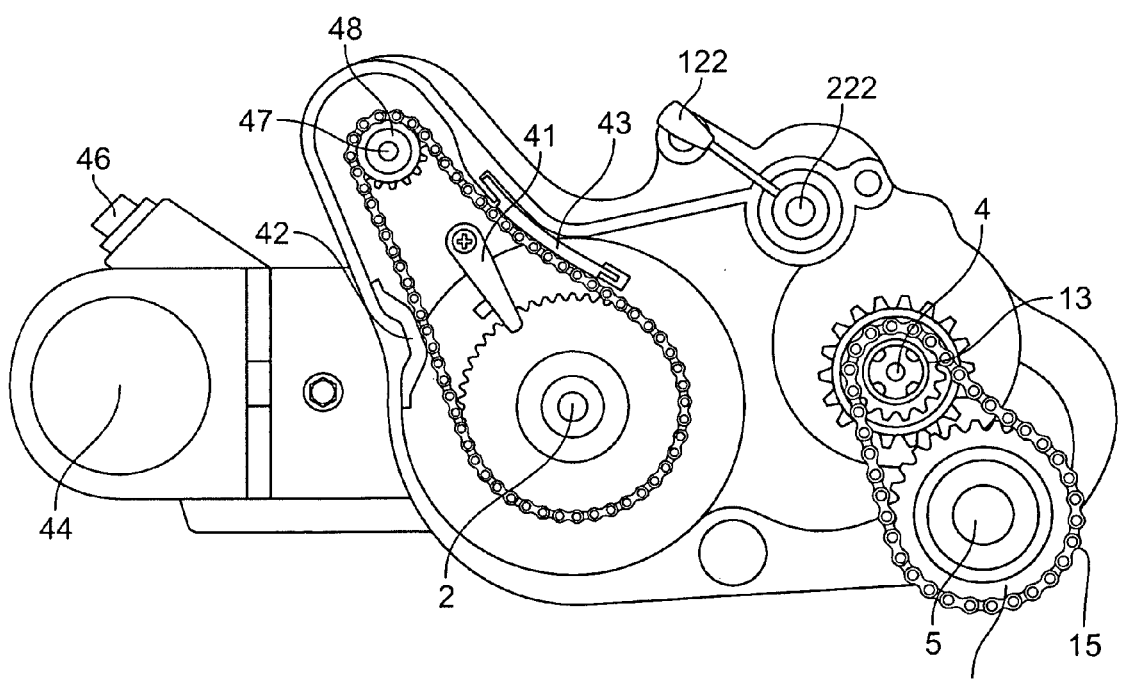
FIG. 3 is a second embodiment right side view of the transmission with the first crankcase member removed.
Figure 4:
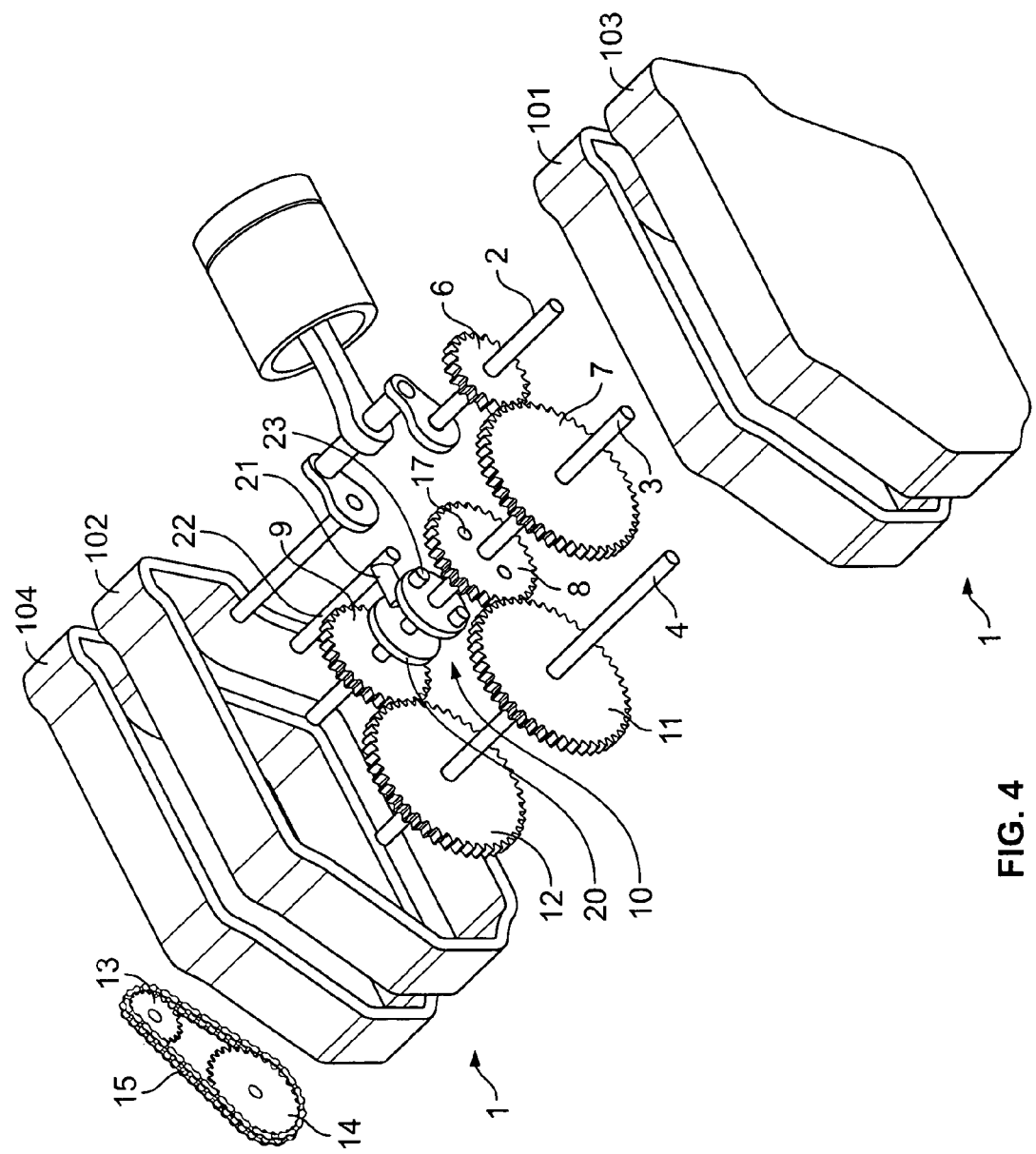
FIG. 4 is a second embodiment exploded view of the present invention.
Figure 5:
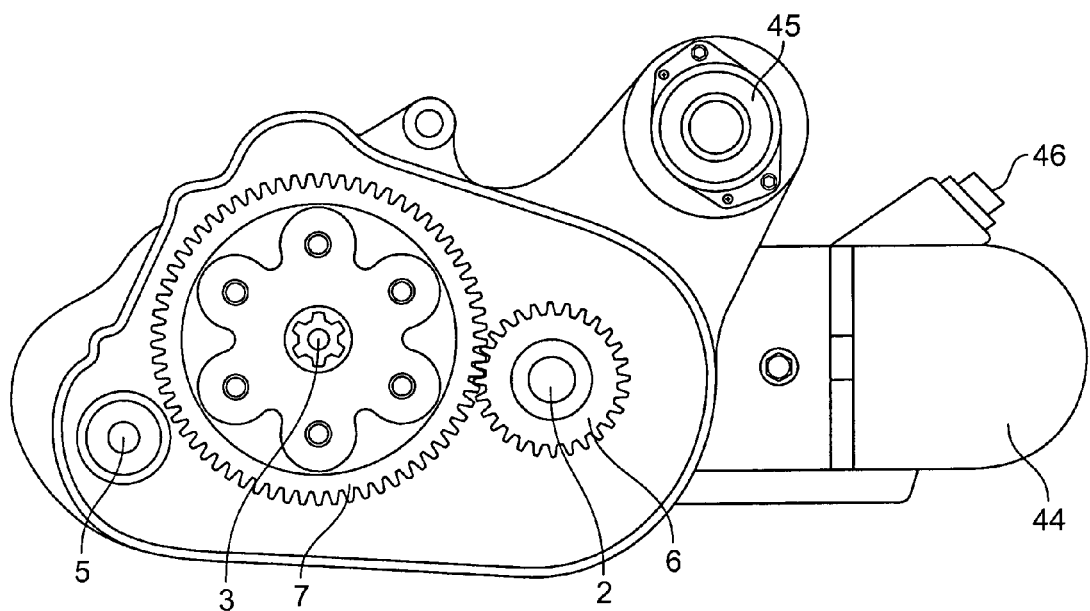
FIG. 5 is a second embodiment left side view of the transmission with the fourth crankcase member removed.

Previous multiple gear embodiments of a moped engine have been bulky and heavy. The present invention can be decreased in both mass and bulk to provide a second embodiment as shown in FIGS. 3-5 while maintaining center of gravity balance with the following configuration described as follows.

The second embodiment is an improvement to the first embodiment by adding additional features such as the electric start, and section configuration. As seen on the second embodiment right side view, with the fourth section 104 removed, one can see that certain elements are mounted to a flat face of the second section 102. The shafts pass through the second section 102 and the first section 101 such that when the first section and the second section are joined, the shafts have clear passage and are mounted for free rotation relative to the crankcase.

The engine 44 is mounted to the crankcase first section 101 and the second section 102 at a rear end of the crankcase. The engine has an access port 46 for servicing, such as for the spark plug. A starter can be electric and mounted to the second section and the fourth section having a starter shaft 47 driving a starter shaft sprocket 48. A gear retainer 41 formed as a leaf spring retains the starter sprocket. The starter sprocket is mounted to the crankshaft on an outside surface of the second section. The fourth section 104 covering the second section 102 also covers the tip of the starter shaft 47, the starter shaft sprocket 48 and the gear retainer 41 formed as a leaf. The fourth section 104 also covers the starter sprocket and the starter chain first retainer 42 as well as the starter chain second retainer 43. The starter chain first retainer 42 cooperates with the starter chain 43 to provide tension to the chain. In total, at least three chains will be installed. The starter chain is installed between the starter shaft sprocket 48 and the starter sprocket. The transmission chain 15 is installed between the output sprocket 13 and the kick start sprocket 14. The driving chain is installed on the inside sprocket of the output shaft underneath the output sprocket. The inside sprocket of the output shaft is coaxial to the output sprocket 13.

A shifter knob 122 is connected to the shifter knob axle 222. The shifter knob 122 rotates the shifter knob axle 222, to disengage and engage the clutch to allow manual mode where the moped is operated like a bicycle, and a motorized mode where the moped is powered by the motor. During use, a user may for example use the manual mode when out of fuel. In manual mode, the drive gear is not powered by the user's legs. The preferred embodiment leaves an opening or otherwise does not use the fourth section to cover up the output sprocket and the kick start sprocket so that easy access can be made to the transmission chain 15. Optionally, the shifter knob axle may be the same axle as the fork device. The fork device therefore may have three positions, namely a first position in a first gear which is a first motorized mode, a second position in a neutral gear which is also the manual mode, and a third position which is the second gear which would be the second motorized mode. If the second gear is removed, there can be just a first gear and neutral.

On the left side of the second embodiment, FIG. 5, the starter motor 45 is shown mounted to the second section 102 and the fourth section 104, but not the first section 101 or the third section 103. With the third section 103 removed, the kick start shaft 5 is shown passing through the first section 101. The kick start shaft 5 also passes through the other sections including the second section 102, the third section 103, and the fourth section 104. Each of the sections stabilizes the shaft from wobbling. Mounted on a vertical flat planar portion of the first section 101 is the crankshaft 2 and the main shaft 3. The crankshaft 2 has mounted the crankshaft gear 6 external to the first section, and has mounted to the main shaft, the main shaft gear 7 which is also mounted external to the first section. Preferably, a clutch is mounted to the crankshaft 2 at the tip above the crankshaft gear 6 so that the engine can be in the idle and not transmit force to the transmission such as the crankshaft gear 6 or the main shaft gear 7, such as when a user is idling the engine at a stoplight.

Although the invention has been disclosed in detail with reference only to the preferred embodiments, those skilled in the art will appreciate that various other embodiments can be provided without departing from the scope of the invention. Accordingly, the invention is defined only by the claims set forth below.

The invention claimed is:

1. A moped transmission comprising:
   a. a crankcase assembled in four sections, namely a first section, a second section, a third section and a fourth section, wherein the first section is connected to the second section, wherein the third section is connected to the first section, wherein the second section is connected to the fourth section, wherein the first section has a first planar vertical mounting face, wherein the second section has a second planar vertical mounting face;
   b. a crankshaft formed as an eccentric shaft, wherein the crankshaft has a crankshaft gear mounted to the crankshaft, wherein the crankshaft passes through the first section, wherein the crankshaft passes through and is rotably mounted to the first planar vertical mounting face, wherein the crankshaft gear is mounted to the crankshaft outside the first section such that the crankshaft gear is encapsulated between the first section and the third section;
   c. an engine connected to the first section and the second section, wherein the engine further includes an engine piston mechanically connected to the crankshaft;
   d. a main shaft having a main shaft gear in mesh with the crankshaft gear, wherein the main shaft passes through and is rotably mounted outside the first planar vertical mounting face, wherein the main shaft gear is mounted to the main shaft outside the first section such that the main shaft gear is encapsulated between the first section and the third section, wherein the main shaft is rotably mounted to the first section and to the second section, wherein the main shaft passes through the first section and the second section;
   e. a synchronizer being slidably mounted to the main shaft;
   f. a primary driving gear mounted to the main shaft, wherein the primary drive gear is selectively engagable with the synchronizer, wherein the primary drive gear rotates freely independent of the main shaft when not engaged with the synchronizer, but rotates with the main shaft when engaged with a synchronizer;

g. a secondary driving gear also mounted to the main shaft, wherein the secondary drive gear is selectively engageable with the synchronizer, wherein the secondary drive gear rotates freely independent of the main shaft when not engaged with the synchronizer, but rotates with the main shaft when engaged with the synchronizer;
h. and output shaft, wherein the output shaft is rotably mounted to the first section and to the second section, wherein the output shaft passes through the first section and the second section;
i. a primary drive gear mounted on the output shaft, wherein the primary drive gear is mounted between the first section and the second section, wherein the primary driving gear is meshed to drive the primary drive gear when the synchronizer engages the primary driving gear;
j. a secondary drive gear mounted on the output shaft, wherein the secondary drive gear is mounted between first section and the second section, wherein the secondary driving gear is meshed to drive the secondary drive gear when the synchronizer engages the secondary driving gear;
k. an output sprocket mounted on the output shaft and receiving rotation from the output shaft when the synchronizer is engaged with either the primary driving gear or the secondary driving gear;
l. a kick start shaft having a kick start sprocket mounted on the kick start shaft, wherein the kick start sprocket, and further including a transmission chain installed between the kick start sprocket and the output sprocket;
m. an inside sprocket is also mounted on the output shaft such that the inside sprocket has an inside sprocket axis of rotation coaxial to an outside sprocket axis of rotation, wherein the inside sprocket drives a wheel of the moped.

2. The moped transmission of claim 1, wherein the primary drive gear, the secondary drive gear, the primary driving gear, the secondary driving gear and the synchronizer are mounted between the first section and the second section.

3. The moped transmission of claim 1, wherein the primary drive gear, the secondary drive gear, the primary driving gear, the secondary driving gear and the synchronizer are mounted between the first section and the second section.

4. The moped transmission of claim 1, further comprising a starter motor mounted to the second section and the fourth section, further including a starter shaft mounted on the starter motor so that it drives a starter shaft sprocket, further including a starter sprocket mounted on the crankshaft, wherein the starter sprocket receives a starter chain, wherein the starter chain mechanically connects the starter shaft sprocket to the starter sprocket.

5. The moped transmission of claim 4, wherein the starter shaft sprocket, the starter chain and the starter sprocket are mounted between the fourth section and the second section.

6. The moped transmission of claim 1, wherein the crankshaft gear and the main shaft gear are mounted between the first section and the third section.

7. The moped transmission of claim 1, wherein the primary drive gear, the secondary drive gear, the primary driving gear, the secondary driving gear and the synchronizer are mounted between the first section and the second section, further comprising a starter motor mounted to the second section and the fourth section, further including a starter shaft mounted on the starter motor so that it drives a starter shaft sprocket, further including a starter sprocket mounted on the crankshaft, wherein the starter sprocket receives a starter chain, wherein the starter chain mechanically connects the starter shaft sprocket to the starter sprocket.

8. The moped transmission of claim 7, wherein the starter shaft sprocket, the starter chain and the starter sprocket are mounted between the fourth section and the second section.

9. The moped transmission of claim 1, wherein the crankshaft gear and the main shaft gear are mounted between the first section and the third section, further comprising a starter motor mounted to the second section and the fourth section, further including a starter shaft mounted on the starter motor so that it drives a starter shaft sprocket, further including a starter sprocket mounted on the crankshaft, wherein the starter sprocket receives a starter chain, wherein the starter chain mechanically connects the starter shaft sprocket to the starter sprocket, wherein the starter shaft sprocket, the starter chain and the starter sprocket are mounted between the fourth section and the second section.

10. A moped transmission comprising:
a. a crankcase assembled in four sections, namely a first section, a second section, a third section and a fourth section, wherein the first section is connected to the second section, wherein the third section is connected to the first section, wherein the second section is connected to the fourth section, wherein the first section has a first planar vertical mounting face, wherein the second section has a second planar vertical mounting face;
b. a crankshaft formed as an eccentric shaft, wherein the crankshaft has a crankshaft gear mounted to the crankshaft, wherein the crankshaft passes through the first section, wherein the crankshaft passes through and is rotably mounted to the first planar vertical mounting face, wherein the crankshaft gear is mounted to the crankshaft outside the first section such that the crankshaft gear is encapsulated between the first section and the third section;
c. an engine connected to the first section and the second section, wherein the engine further includes an engine piston mechanically connected to the crankshaft;
d. a main shaft having a main shaft gear in mesh with the crankshaft gear, wherein the main shaft passes through and is rotably mounted outside the first planar vertical mounting face, wherein the main shaft gear is mounted to the main shaft outside the first section such that the main shaft gear is encapsulated between the first section and the third section, wherein the main shaft is rotably mounted to the first section and to the second section, wherein the main shaft passes through the first section and the second section;
e. a synchronizer being slidably mounted to the main shaft;
f. a primary driving gear mounted to the main shaft, wherein the primary drive gear is selectively engagable with the synchronizer, wherein the primary drive gear rotates freely independent of the main shaft when not engaged with the synchronizer, but rotates with the main shaft when engaged with a synchronizer;
g. a secondary driving gear also mounted to the main shaft, wherein the secondary drive gear is selectively engageable with the synchronizer, wherein the secondary drive gear rotates freely independent of the main shaft when not engaged with the synchronizer, but rotates with the main shaft when engaged with the synchronizer;
h. and output shaft, wherein the output shaft is rotably mounted to the first section and to the second section, wherein the output shaft passes through the first section and the second section;
i. a primary drive gear mounted on the output shaft, wherein the primary drive gear is mounted between the first section and the second section, wherein the primary driving gear is meshed to drive the primary drive gear when the synchronizer engages the primary driving gear;

j. a secondary drive gear mounted on the output shaft, wherein the secondary drive gear is mounted between first section and the second section, wherein the secondary driving gear is meshed to drive the secondary drive gear when the synchronizer engages the secondary driving gear;

k. an output sprocket mounted on the output shaft and receiving rotation from the output shaft when the synchronizer is engaged with either the primary driving gear or the secondary driving gear;

l. a kick start shaft having a kick start sprocket mounted on the kick start shaft, wherein the kick start sprocket, and further including a transmission chain installed between the kick start sprocket and the output sprocket;

m. an inside sprocket is also mounted on the output shaft such that the inside sprocket has an inside sprocket axis of rotation coaxial to an outside sprocket axis of rotation, wherein the inside sprocket drives a wheel of the moped; and n. a starter motor having a power output parallel to the crankshaft, wherein the starter motor these mounted to the second section and the fourth section, further including a starter shaft mounted on the starter motor so that it drives a starter shaft sprocket, further including a starter sprocket mounted on the crankshaft, wherein the starter sprocket receives a starter chain, wherein the starter chain mechanically connects the starter shaft sprocket to the starter sprocket.

11. The moped transmission of claim 10, wherein the starter shaft sprocket, the starter chain and the starter sprocket are mounted between the fourth section and the second section, wherein the primary drive gear, the secondary drive gear, the primary driving gear, the secondary driving gear and the synchronizer are mounted between the first section and the second section, further comprising a starter motor.

12. The moped transmission of claim 10, wherein the primary drive gear, the secondary drive gear, the primary driving gear, the secondary driving gear and the synchronizer are mounted between the first section and the second section.

13. The moped transmission of claim 10, wherein the primary drive gear, the secondary drive gear, the primary driving gear, the secondary driving gear and the synchronizer are mounted between the first section and the second section.

14. The moped transmission of claim 10, further comprising a starter motor mounted to the second section and the fourth section, further including a starter shaft mounted on the starter motor so that it drives a starter shaft sprocket, further including a starter sprocket mounted on the crankshaft, wherein the starter sprocket receives a starter chain, wherein the starter chain mechanically connects the starter shaft sprocket to the starter sprocket.

15. The moped transmission of claim 14, wherein the starter shaft sprocket, the starter chain and the starter sprocket are mounted between the fourth section and the second section.

16. The moped transmission of claim 10, wherein the crankshaft gear and the main shaft gear are mounted between the first section and the third section.

17. The moped transmission of claim 10, wherein the crankshaft gear and the main shaft gear are mounted between the first section and the third section, further comprising a starter motor mounted to the second section and the fourth section, further including a starter shaft mounted on the starter motor so that it drives a starter shaft sprocket, further including a starter sprocket mounted on the crankshaft, wherein the starter sprocket receives a starter chain, wherein the starter chain mechanically connects the starter shaft sprocket to the starter sprocket, wherein the starter shaft sprocket, the starter chain and the starter sprocket are mounted between the fourth section and the second section.

* * * * *